(12) United States Patent
Acera et al.

(10) Patent No.: US 10,553,089 B2
(45) Date of Patent: Feb. 4, 2020

(54) BUILDING SECURITY AND AUTOMATION SYSTEM SPEAKER AND METHOD

(71) Applicant: Nortek Security & Control LLC, Carlsbad, CA (US)

(72) Inventors: Christopher Laguer Acera, Carlsbad, CA (US); Bruce James Ehlers, Encinitas, CA (US); Kaoru Hisamoto, Walnut, CA (US); David Alan Krula, San Diego, CA (US); Brian Vencil Skarda, South Jordan, UT (US); Robert John True, Pleasant Prairie, WI (US); Lance Leo Dean, Colleyville, TX (US); Dale Pedersen, Kaysville, UT (US); Geoff Goldberg, Encinitas, CA (US); Loren Bryner, South Ogden, UT (US)

(73) Assignee: Nortek Security & Control LLC, Carlsbad, CA (US)

( * ) Notice: Subject to any disclaimer, the term of this patent is extended or adjusted under 35 U.S.C. 154(b) by 60 days.

(21) Appl. No.: 15/871,771

(22) Filed: Jan. 15, 2018

(65) Prior Publication Data

US 2018/0158295 A1    Jun. 7, 2018

Related U.S. Application Data

(63) Continuation of application No. 15/114,380, filed as application No. PCT/US2015/013036 on Jan. 27, 2015.

(Continued)

(51) Int. Cl.
*G08B 13/08*      (2006.01)
*H04W 4/80*       (2018.01)
(Continued)

(52) U.S. Cl.
CPC .............. *G08B 13/08* (2013.01); *G08B 3/10* (2013.01); *G08B 13/19684* (2013.01);
(Continued)

(58) Field of Classification Search
CPC ............. G08B 13/08; G08B 13/19684; G08B 25/008; G08B 25/009; G08B 25/10;
(Continued)

(56) References Cited

U.S. PATENT DOCUMENTS 4,591,020 A  *  5/1986  Hruby, Jr. ............ H04R 1/2888
                                                          181/145
6,105,136 A      8/2000  Cromer et al.
(Continued)

FOREIGN PATENT DOCUMENTS

WO    WO_2008041214 A1    4/2008

OTHER PUBLICATIONS

"EPO Examination Report for related European Region Application EP 15747588.0, dated Nov. 29, 2019, 5 pages."

*Primary Examiner* — Omer S Khan
(74) *Attorney, Agent, or Firm* — Charles A. Lemaire; Jonathan M. Rixen; Lemaire Patent Law Firm, P.L.L.C.

(57) ABSTRACT

A security system control panel or home automation control panel including an end-user replaceable cellular telephony module that is removable from the control panel without disassembling the control panel. The cellular module includes a body, a cellular telephony circuit coupled to the body, a cellular telephony antenna coupled to the body and the cellular telephony circuit, and a first connector coupled to the cellular telephony circuit and the body, wherein the first connector is sized and shaped or otherwise configured to be removably engaged by the end-user with a second connector in the control panel.

15 Claims, 13 Drawing Sheets

Related U.S. Application Data

(60) Provisional application No. 61/931,945, filed on Jan. 27, 2014.

(51) Int. Cl.

| | | |
|---|---|---|
| *G08B 13/196* | (2006.01) | |
| *G08B 25/00* | (2006.01) | |
| *G08B 25/10* | (2006.01) | |
| *G08B 25/14* | (2006.01) | |
| *H04L 12/28* | (2006.01) | |
| *H02J 50/80* | (2016.01) | |
| *H02J 50/20* | (2016.01) | |
| *G08B 3/10* | (2006.01) | |

(52) U.S. Cl.
CPC ......... *G08B 25/008* (2013.01); *G08B 25/009* (2013.01); *G08B 25/10* (2013.01); *G08B 25/14* (2013.01); *H02J 50/20* (2016.02); *H02J 50/80* (2016.02); *H04L 12/282* (2013.01); *H04W 4/80* (2018.02); *H04L 2012/285* (2013.01); *H04L 2012/2841* (2013.01)

(58) Field of Classification Search
CPC .. G08B 25/14; G08B 3/10; H02J 50/20; H02J 50/80; H04L 12/282; H04L 2012/2841; H04L 2012/285; H04W 4/80
See application file for complete search history.

(56) References Cited

U.S. PATENT DOCUMENTS

| | | |
|---|---|---|
| 8,638,211 B2 | 1/2014 | Cohn et al. |
| 8,754,634 B2 | 6/2014 | Chamarti et al. |
| 8,760,269 B2 | 6/2014 | Feldstein et al. |
| 2002/0107042 A1 | 8/2002 | Murnaghan |
| 2004/0260407 A1 | 12/2004 | Wimsatt |
| 2011/0002488 A1* | 1/2011 | Van Daele ............... H04R 5/02 381/307 |
| 2011/0128157 A1* | 6/2011 | Oh ........................ G08B 25/14 340/691.1 |
| 2012/0062370 A1* | 3/2012 | Feldstein ............... G06F 1/1626 340/13.22 |
| 2012/0314354 A1* | 12/2012 | Rayner .................. H01H 13/06 361/679.01 |
| 2013/0113606 A1 | 5/2013 | Etheridge et al. |
| 2014/0253340 A1* | 9/2014 | Albert ...................... G08B 3/10 340/692 |
| 2014/0365073 A1* | 12/2014 | Stanek ................ H04M 1/6091 701/36 |

* cited by examiner

BUILDING SECURITY AND AUTOMATION SYSTEM SPEAKER AND METHOD

CROSS-REFERENCE TO RELATED APPLICATIONS

This application is a continuation of U.S. patent application Ser. No. 15/114,380, filed Jul. 26, 2016 by Christopher L. Acera et al. and titled "Building security and automation system," (now abandoned), which is a national-phase filing of, and claims priority benefit of, PCT Patent Application No. PCT/US2015/013036, filed Jan. 27, 2015 by Acera et al. and titled "Building security and automation system," which claims the benefit of priority to U.S. Provisional Application No. 61/931,945, titled "Building security and automation system" by Acera et al. and filed on Jan. 27, 2014, the entire content of each of which being incorporated herein by reference.

This application is related to the following U.S. Patent Applications filed on even date herewith (Jan. 15, 2018): U.S. patent application Ser. No. 15/871,584, filed Jan. 15, 2018 by Christopher L. Acera et al. and titled "BUILDING SECURITY AND AUTOMATION SYSTEM DISARMING APPARATUS AND METHOD,"
U.S. patent application Ser. No. 15/871,764, filed Jan. 15, 2018 by Christopher L. Acera et al. and titled "BUILDING SECURITY AND AUTOMATION SYSTEM HAVING USER-DEFINED SCREENS AND ASSOCIATED METHOD," and
U.S. patent application Ser. No. 15/871,749, filed Jan. 15, 2018 by Christopher L. Acera et al. and titled "BUILDING SECURITY AND AUTOMATION SYSTEM WITH REMOTE-POWERED DATA STORE AND DELAYED DATA UPDATE AND METHOD".

TECHNICAL FIELD

This document pertains generally, but not by way of limitation, to security and automation systems.

SUMMARY

Figure 1:
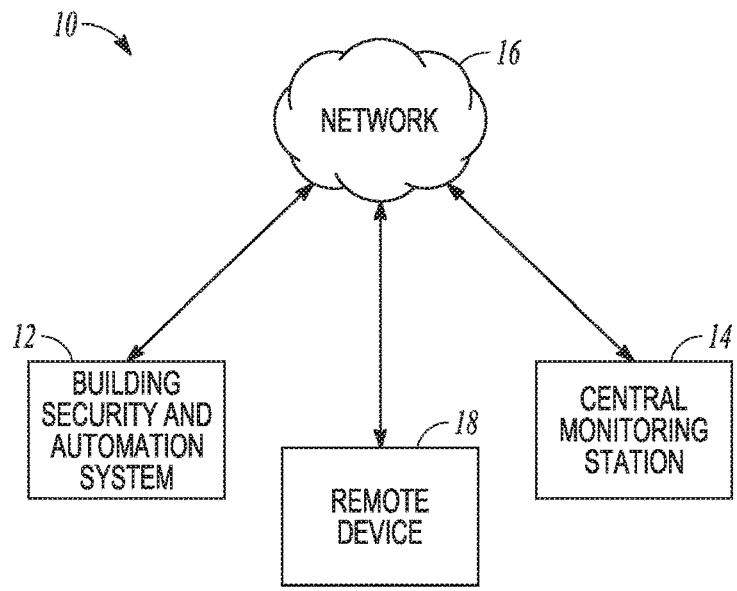
FIG. 1 is a conceptual diagram illustrating an example of a system that includes a building security and automation system and a central monitoring station.

In one example, this disclosure is directed to a security system control panel or home automation control panel comprising an end-user replaceable cellular telephony module that is removable from the control panel without disassembling the control panel, the cellular module including a body; a cellular telephony circuit coupled to the body; a cellular telephony antenna coupled to the body and the cellular telephony circuit; and a first connector coupled to the cellular telephony circuit and the body, wherein the first connector is sized and shaped or otherwise configured to be removably engaged by the end-user with a second connector in the control panel.

In one example, this disclosure is directed to a security system control panel or home automation control panel comprising a display; a housing configured to support the display; and a speaker having a front from which sound is projected, a rear opposite the front, a first side, and a second side opposite the first side; and a sealed speaker enclosure positioned within the housing, the sealed speaker enclosure including a speaker case, wherein a portion of the speaker case and a portion of the speaker define the sealed speaker enclosure.

In one example, this disclosure is directed to a security system control panel or home automation control panel comprising a Bluetooth circuit configured to receive at least one Bluetooth signal from one or more Bluetooth-enabled devices; a processor configured to store data identifying an authorized Bluetooth-enabled device in a memory; detect the authorized Bluetooth-enabled device; and disarm the security system control panel in response to the detection.

In one example, this disclosure is directed to security system control panel or home automation control panel comprising a user interface including a display; and a home screen module configured to: receive an input from the end-user defining at least one screen depicted on the display; store data representing the at least one end-user-defined screen in a memory; and perform one or more actions previously associated by the user with the defined screen.

In one example, this disclosure is directed to a security system control panel or home automation control panel comprising an end-user replaceable cellular telephony module that is removable from the control panel without disassembling the control panel, the cellular module including a body; a cellular telephony circuit coupled to the body; a cellular telephony antenna coupled to the body and the cellular telephony circuit; and a first connector coupled to the cellular telephony circuit and the body, wherein the first connector is sized and shaped or otherwise configured to be removably engaged by the end-user with a second connector in the control panel. The control panel further includes a display; a housing configured to support the display; a speaker having a front from which sound is projected, a rear opposite the front, a first side, and a second side opposite the first side; and a sealed speaker enclosure positioned within the housing, the sealed speaker enclosure including a speaker case, wherein a portion of the speaker case and a portion of the speaker define the sealed speaker enclosure. The control panel further includes a user interface including the display; and a home screen module configured to: receive an input from the end-user defining at least one screen depicted on the display; store data representing the at least one end-user-defined screen in a memory; and perform one or more actions previously associated by the user with the defined screen; a Bluetooth circuit configured to receive at least one Bluetooth signal from one or more Bluetooth-enabled devices; a processor configured to: store data identifying an authorized Bluetooth-enabled device in a memory; detect the authorized Bluetooth-enabled device; and disarm the security system control panel in response to the detection. The control panel further includes a radio-frequency (RF) circuit configured to: when the control panel is in an unpowered state: receive power from an RF signal from an RF programming device; receive data embedded in the RF signal from the powered RF circuit; and using the received power from the RF signal store the data in a memory that is otherwise unpowered, wherein the processor is configured to: when the control panel is in a powered state: receive the stored data; and configure at least one parameter using the received data.

DETAILED DESCRIPTION

FIG. 1 is a conceptual diagram illustrating an example of a system 10 that may include a building security and automation system 12 and a central monitoring station 14 that monitors received communications from one or more building security and automation systems 12. As seen in FIG. 1, the building security and automation system 12 (also referred to in this disclosure as "security system 12") may transmit signals to and receive signals from the central monitoring station 14 via a network 16. For example, the security system 12 may detect an unauthorized opening of a monitored building, e.g., home, door or window and transmit an alarm signal to the central monitoring station 14. In response, personnel at the central monitoring station 14 may attempt to contact a user by way of a control panel (depicted in detail in FIG. 3) of the security system 12, e.g., using bidirectional communication techniques.

The security system 12 may communicate with the central monitoring station 14 using wired or wireless communication techniques. In one example implementation, the network 16 may utilize a traditional POTS (plain old telephone service) telephone line, or wired Ethernet. In another example implementation, the network 16 may be a cellular telephone network for wireless communication. It may be desirable to communicate signals wirelessly to the central monitoring station 14 in order to eliminate an intruder's ability to cut or otherwise damage a wired phone line and thus disable communications.

The security system 12 may also receive control signals via a remote device 18, e.g., a smartphone, tablet computer, or other computing device, that may control one or more aspects of the security system 12. Also, the remote device 18 may receive status signals from the security system 12 that indicate one or more statuses of the security system 12.

For example, in the event that a user forgot to arm the security system 12 at their premises, the user may remotely arm the security system 12 using the remote device 18 via the network 16. Initially, the remote device 18 may receive a status signal from the security system 12 indicating that the security system 12 is unarmed, and display the status, e.g., via an application executed on a smartphone. Then, after the remote device 18 transmits a control signal to arm the security system 12, the remote device 18 may receive a status signal from the security system 12 indicating that the security system 12 is armed, and display the status.

In addition, the security system 12 of FIG. 1 may receive signals that may be used as part of an automation scheme to control various aspects of the building, e.g., home. For example, a user may use a control panel (depicted in detail in FIG. 3) of the security system 12 to, for example, turn lights on/off in a home or other building, adjust a temperature, e.g., raise or lower a thermostat setting, and the like.

In another example, the user may use a remote device 18, e.g., a smartphone, tablet computer, or other computing device, to transmit signals to the control panel of the security system 12 via the network 16 to turn lights on/off in a home or other building, adjust a temperature, e.g., raise or lower a thermostat setting, and the like.

Figure 2:
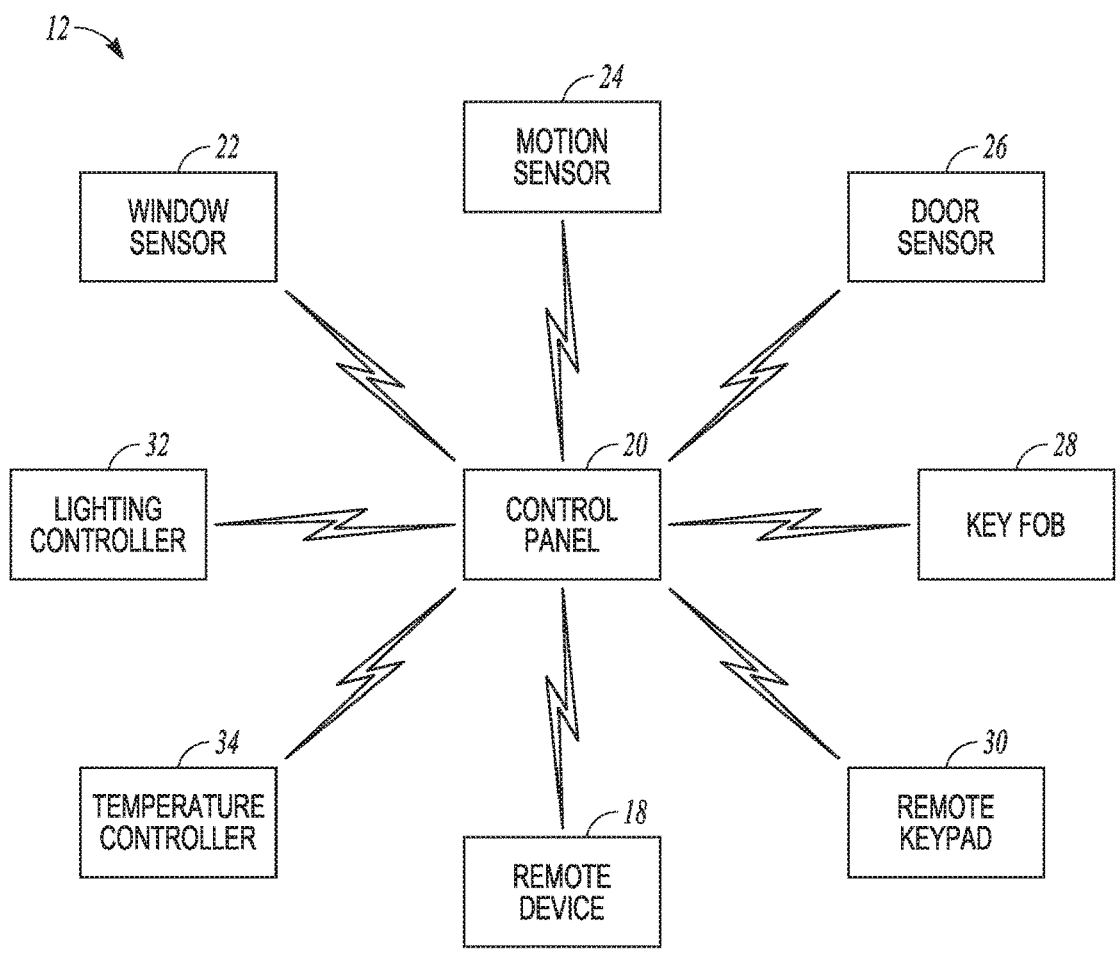
FIG. 2 is a conceptual diagram illustrating various examples of components of the security system 12 of FIG. 1, including a control panel and various sensors.

FIG. 2 is a conceptual diagram illustrating various examples of components of the security system 12 of FIG. 1, including a control panel 20 and various sensors. As seen in FIG. 2, the security system 12 may include a control panel 20 for receiving status signals from various sensors, including, for example, a window sensor 22, a motion sensor 24, and a door sensor 26. Numerous other types of sensors may also be included as part of the security system 12, which are not depicted FIG. 2. For example, the security system 12 may also include one or more of the following sensors: glass break sensors, smoke detection sensors, carbon monoxide detection sensors, and flooding sensors.

In addition, the security system 12 may include a key fob 28 that may transmit control signals, e.g., RF control signals, to the control panel 20 to control various aspects of the security system 12. For example, a user may remotely arm/disarm the security system 12 using the key fob 28.

The security system 12 may also include a remote keypad 30 that may transmit control signals to and receive status signals from the control panel 20. For example, a remote keypad 30 may be located in a bedroom of a home, thereby allowing a user to arm/disarm the security system 12 or view the status of the security system 12 from the bedroom without having to use the control panel 20, which may be located in another part of the home.

As mentioned above, the security system 12 may also be used for automation purposes. As non-limiting examples, the control panel 20 of FIG. 2 (and/or the remote keypad 30) may depict a lighting controller 32 and a temperature controller 34. The control panel 20 may be configured to transmit control signals to the lighting controller 32 that turns one or more lights in a building on/off. In some example implementations, the control panel 20 may transmit the lighting control signals at programmed times, e.g., using a programmed daily schedule.

In addition, the control panel 20 may be configured to transmit control signals to a temperature controller 34 that adjusts a temperature, e.g., raise or lower a thermostat setting, in a building. In some example implementations, the control panel 20 may transmit the temperature control signals at programmed times, e.g., using a programmed daily schedule.

The remote keypad 30 may be configured to transmit control signals to the control panel 20, which can then transmit the signal(s) to the lighting controller 32 and/or the temperature controller 34, e.g., using a programmed daily schedule.

Further, and as mentioned above, in some example implementations the control panel 20 may receive signals from and/or transmit signals to a remote device 18, e.g., a smartphone, tablet computer, or other computing device. The remote device 18 may receive status signals from the control panel 20 that indicate one or more statuses of the security system 12, e.g., whether the system is armed or disarmed.

The remote device 18 may also transmit control signals that control one or more aspects of the security system 12.

In some example implementations, the security system 12 may include one or more speakers (not depicted) as part of a home automation system, for example. Enunciations, signals, or other alerts from the security system may interrupt an audio stream playing through the speakers and transmit the enunciations, signals, or other alerts through the speakers.

Figure 3:
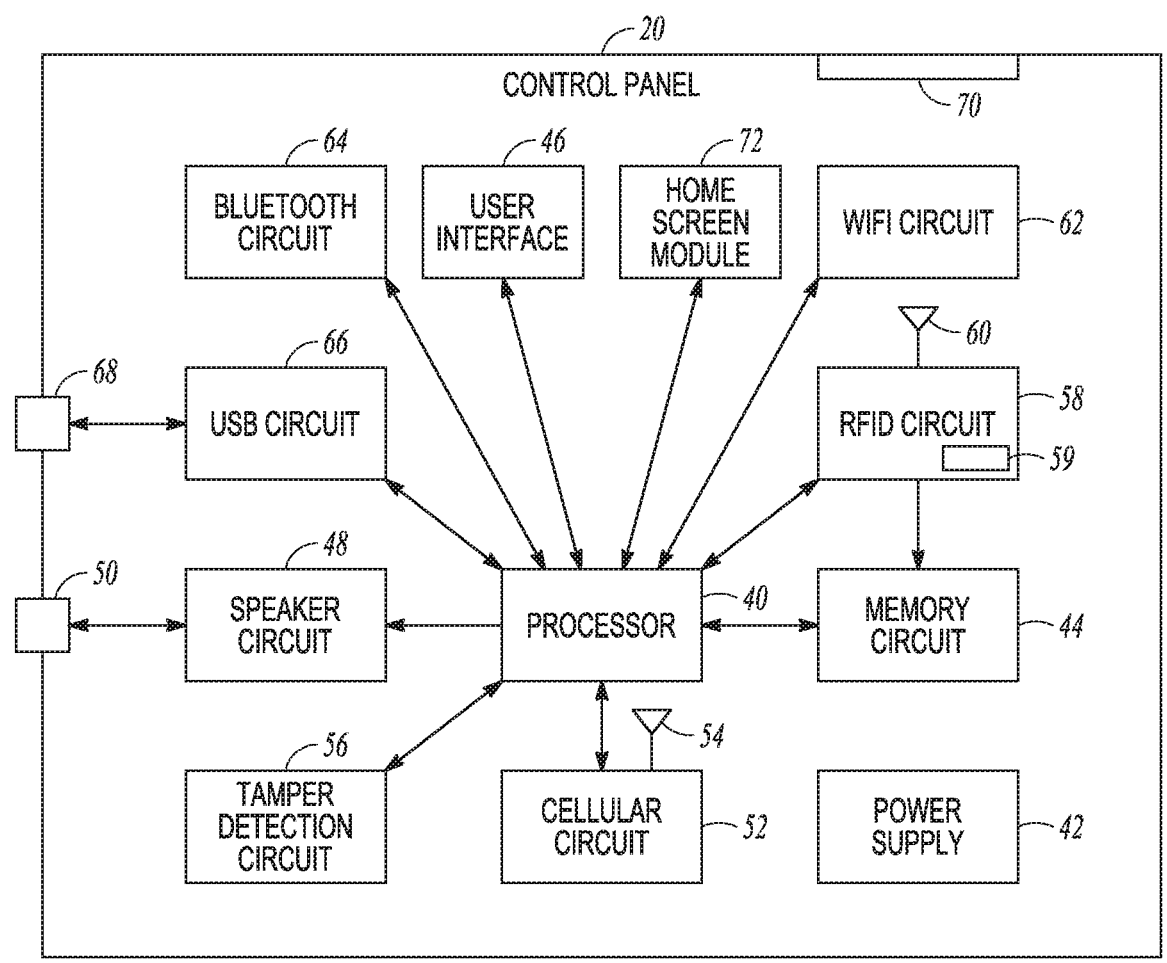
FIG. 3 is a functional block diagram illustrating an example of the control panel of the security system in FIG. 2, in accordance with this disclosure.

FIG. 3 is a functional block diagram illustrating an example of the control panel 20 of the security system in FIG. 2, in accordance with this disclosure. The control panel 20 of FIG. 3 may include a processor 40, a power supply 42 (e.g., an AC powered source and a battery backup circuit), a memory circuit (or memory device) 44, a user interface 46 configured to receive input from a user, a speaker circuit 48, and a speaker 50. In some example implementations, the control panel 20 can also include a piezoelectric siren circuit and piezoelectric transducer (not depicted).

The processor 40 may be a microprocessor, general purpose controller, field-programmable gate array (FPGA), application-specific integrated circuit (ASIC), or other discrete or integrated logic circuitry, for example.

In some example implementations, the user interface 46 may include a touchscreen display for receiving input, e.g., arming/disarming the security system 12, or defining a home screen or bookmark. In such examples, the touchscreen display may display one or more buttons for controlling various aspects of the security system. In other examples, the user interface may include a display and one or more physical buttons for controlling various aspects of the security system 12.

The memory circuit 44 may include one or more volatile or non-volatile memory devices, e.g., Flash memory, RAM, EPROM, EEPROM, embedded MMC, etc. The memory circuit 44 may store instructions that, when executed by the processor 40, configure the processor 40 to perform the functionality described in this disclosure. For example, upon receiving an input to arm the security system 12, the processor 40 may execute instructions that cause the speaker circuit 48 to output a signal to the speaker 50 that announces that the security system will soon be armed.

In addition, the control panel 20 may include a cellular circuit 52 with an associated antenna 54 for transmitting signals to and receiving signals from the central monitoring station 14 or the remote device 18, e.g., via a cellular network 16. As described in more detail below, and in accordance with this disclosure, the cellular circuit 52 and the antenna 54 may be formed as part of a replaceable cellular module (shown at 110 in FIGS. 7, 8A, 8B). This replaceable module may allow a customer or technician, for example, to replace a cellular module without disassembling the control panel 20.

In accordance with this disclosure, and as described in more detail below, the cellular circuit 52, e.g., radio, and the antenna 54 may be interchangeable on the replaceable cellular module. The antenna 54 may be detachable so that a first antenna can be detached and replaced by a second antenna, e.g., an antenna extending outside the control panel (external), on the replaceable cellular module. This may allow the manufacturer, for example, to pair a radio and an antenna on the replaceable cellular module at the factory so that the customer does not have to connect the antenna and the radio.

Given that, in some examples, the cellular circuit 52 and the antenna 54 may form the communication link to the central monitoring station 14, it may be desirable to detect whether an attempt has been made to remove or otherwise tamper with the replaceable cellular module. Hence, in accordance with this disclosure, the control panel 20 may also include a tamper detection circuit 56 for detecting when a door (shown in FIGS. 5 and 7) that allows the replaceable cellular module to be replaced has been opened and, if so, transmit an alarm signal to the central monitoring station 14 before the replaceable cellular module has been removed from the control panel 20.

In order to transmit or receive control or status signals, e.g., to the central monitoring station 14, the cellular circuit 52 can generally be powered when the control panel 20 is powered. Removing the replaceable cellular module from the control panel 20 while the replaceable cellular module is powered, however, may damage the replaceable cellular module and/or the control panel 20. For example, removal of a powered cellular module from the control panel 20 may cause electrical arcing at the connector pins, which may permanently damage the control panel 20. Hence, in accordance with this disclosure and as described in detail below, the processor 40 may remove power from the cellular circuit 52 if the tamper detection circuit 56 detects that the door (shown in FIGS. 5 and 7) has been opened.

The control panel 20 of FIG. 3 may also include a radio-frequency identification (RFID) circuit 58, in accordance with this disclosure. The RFID circuit 58 may allow a manufacturer, for example, to download configuration parameters into an onboard memory circuit 59 of the RFID circuit 58, for example, while the control panel 20 is in a sealed box in the factory. The RFID circuit 58 can write to the onboard memory 59 even when the control panel 20 is not powered up. When the control panel is an unpowered state, the RFID circuit 58 can receive power from an RF signal from an RF programming device, receive data embedded in the RF signal from the powered RF circuit, and, using the received power from the RF signal, store the data in the memory 59 that is otherwise unpowered. When the control panel 20 is powered up in a powered state, the processor 40 can read/receive the stored data from the memory 59 and configure the control panel 20 (and track other parameters and functions) using the received data and data stored in memory circuit 44.

Upon receiving a signal from an RFID programmer unit, the RFID circuit 58, which includes an antenna 60, powers up and begins receiving, for example, the configuration parameters that may then be stored directly to the onboard memory circuit 59 of the RFID circuit 58. This may allow a manufacturer or distributor, for example, to customize one or more packaged, unpowered control panels based on customer preferences before the control panels are shipped to the customer. For example, after the control panel is powered up, the processor 40 can read the stored configuration parameters from the onboard memory 59 and retrieve from the memory circuit 44 the instructions needed to configure the default language, e.g., English, Spanish, Portuguese, Italian, French, Japanese, etc., of the control panel 20 based on the customer's geographic region.

The control panel 20 of FIG. 3 may also include a Wi-Fi circuit 62. In some example configurations, the Wi-Fi circuit 62 may include Wi-Fi Direct functionality, in accordance with this disclosure. Wi-Fi Direct may allow various Wi-Fi enabled components of the security system 12 to communicate with one another without using a wireless access point, e.g., a wireless router.

In one example configuration, the security system 12 may include one or more remote keypads 30 that include Wi-Fi chips and are Wi-Fi enabled. Using the Wi-Fi Direct functionality of the Wi-Fi circuit 62 of FIG. 3, the one or more Wi-Fi enabled remote keypads 30 may establish a peer-to-peer connection with the control panel 20, instead of using a wireless access point of a home network, for example. By allowing the remote keypad(s) to communicate directly with the control panel using Wi-Fi Direct may eliminate the need to use a proprietary wireless communication protocol or use wired communications techniques. In addition, using Wi-Fi Direct instead of Wi-Fi may simplify the setup for the user by eliminating the need for a wireless access point.

In some examples, the control panel 20 can be configured to interface with a home automation controller using serial or TCP/IP protocols, for example. For example, the control panel 20 can include a terminal block (not depicted) that can connect to the home automation controller using a wired connection, e.g., via RS-232 serial cable or via an Ethernet cable. In other examples, the control panel 20 can connect using a wireless protocol, e.g., IEEE 802.11 standards.

In some examples, the control panel 20 can receive signals from a Wi-Fi connected camera (not depicted) using the Wi-Fi circuit 62. The Wi-Fi connected camera can be used to detect motion. For example, the Wi-Fi connected camera can detected. In other examples, the panel can also receive camera signal over a wired Ethernet connection.

The control panel 20 of FIG. 3 may also include a Bluetooth circuit 64 configured to receive at least one Bluetooth signal from one or more Bluetooth-enabled devices. In some example configurations, the Bluetooth circuit 64 may be used by the control panel 20 to automatically disarm the security system 12 when an authorized Bluetooth-enabled device is within range of the control panel 20. Bluetooth is a communications protocol standardized as IEEE 802.15.1.

For example, upon an initial pairing via the Bluetooth circuit 64 with an authorized Bluetooth-enabled device, e.g., a user's smartphone, the processor 40 of the control panel 20 may instruct the memory circuit 44 to store data identifying the authorized Bluetooth-enabled device(s), e.g., a user's smartphone. After the security system 12 has been armed, each time the processor detects that a Bluetooth-enabled device is within range of the Bluetooth circuit 64 of the control panel 20, the processor 40 may retrieve the identifying data from the memory circuit 44, determine whether the Bluetooth-enabled device is an authorized device, and, if so, disarm the control panel 20 automatically, e.g., without any action taken by the user.

In some example implementations, the processor 40 may cause a confirmation message to be transmitted to an authorized user prior to disarming the security system 12. Once the authorized user affirmatively responds to the confirmation message, the processor 40 may disarm the security system 12.

The control panel 20 of FIG. 3 may also include a Universal Serial Bus (USB) circuit 66 connected to a USB connector 68, e.g., micro-USB, mini-USB, or other USB compatible connector. The USB connector 68 and USB circuit 66 may allow peripheral electronic component(s) to be added to the security system 12. For example, a USB web-camera (not depicted) may be connected to the control panel 20 using the USB connector 68. Connecting a USB web-camera using the USB connector 68 may be desirable as it allows the web-camera to be easily upgraded or otherwise replaced. In addition, the USB web-camera may be articulated to allow it to point at a particular location, in contrast to a camera that is integrated into the control panel 20 and thus cannot turn. In some examples, a standard USB extension cable could be used to locate the camera a few feet away from the panel in almost any orientation. In some examples, the user may remotely control the articulation of the web-camera, e.g., using the remote device 18. In some examples, the control panel 20 may include a camera integrated into the control panel (not depicted).

In some examples, a camera, e.g., USB camera or integrated camera, can be used to disarm or arm the alarm system using biometric authentication, e.g., retinal scan, face recognition, etc. Initially, the control panel 20 can use the camera(s) to scan and store biometric information for one more users. Once armed, for example, the control panel 20 can request that a user position a recognizable feature, e.g., eye, face, etc., close to the camera. Upon comparing the feature to the stored information, the control panel 20 can disarm the system.

In some examples, the control panel 20 can include a connector that can be connected to an accessory radio transceiver (not depicted). The accessory transceiver can be used to receive signals from one or more peripheral devices and increase the functionality of the control panel 20. For example, the accessory radio transceiver can receive signal from a wireless camera or a wireless image sensor, e.g., motion detector with a camera to capture an image. In some implementations, the accessory transceiver can be placed behind the wall upon which the control panel is mounted to conserve space.

The control panel 20 may also include a leveling vial 70 that is integrated into the housing of the control panel 20. An integrated leveling vial 70 may allow a technician or other user to more quickly and accurately install the control panel 20.

As mentioned above, the control panel 20 may include a speaker 50. In accordance with this disclosure and as described in more detail below with respect to FIGS. 6A-6B, the speaker 50 may be enclosed within a sealed chamber. By enclosing the speaker 50 within the sealed chamber, the sound volume may be increased, e.g., by about 10 decibels (dB), relative to speaker 50 similarly positioned in a similar control panel, e.g., having dimensions of about 2 inches by about 5.5 inches by about 1.25 inches, and tested on a wall about 10 feet away from the control panel. In addition, the sealed chamber may improve the bass and midrange frequency response of the speaker 50 and thus improve the sound quality. Another advantage of the sealed speaker design is to provide equivalent sound at a reduced the size and depth. As a result, the control panel can be smaller and thinner.

Finally, in accordance with this disclosure, the control panel 20 may include a home screen module 72 that can receive an input from a user defining one or more screens depicted on a display 46, store data representing the at least one user-defined screen in a memory, e.g., memory circuit 44, and perform one or more actions previously associated by the user with the defined screen. The home screen module 72 may enable a user to associate one or more actions such as, for example, temperature settings, lighting settings, security settings, with the default or primary screen of the display of the user interface of their control panel 20 or remote keypad 30, which can allow the user interface, without navigating beyond the nominal default screen, to be a home control panel, security panel, bed-side controller, room controller, thermostat controller or other type of panel. Defining a home screen or defining bookmarks, e.g., a customized screen that is not necessarily a default or primary screen, may reduce the number of keystrokes that the user must enter to reach a desired screen or prompt on the user interface. The home screen module 72 can then perform the one or more actions previously associated by the user with the defined screen.

Figure 4:
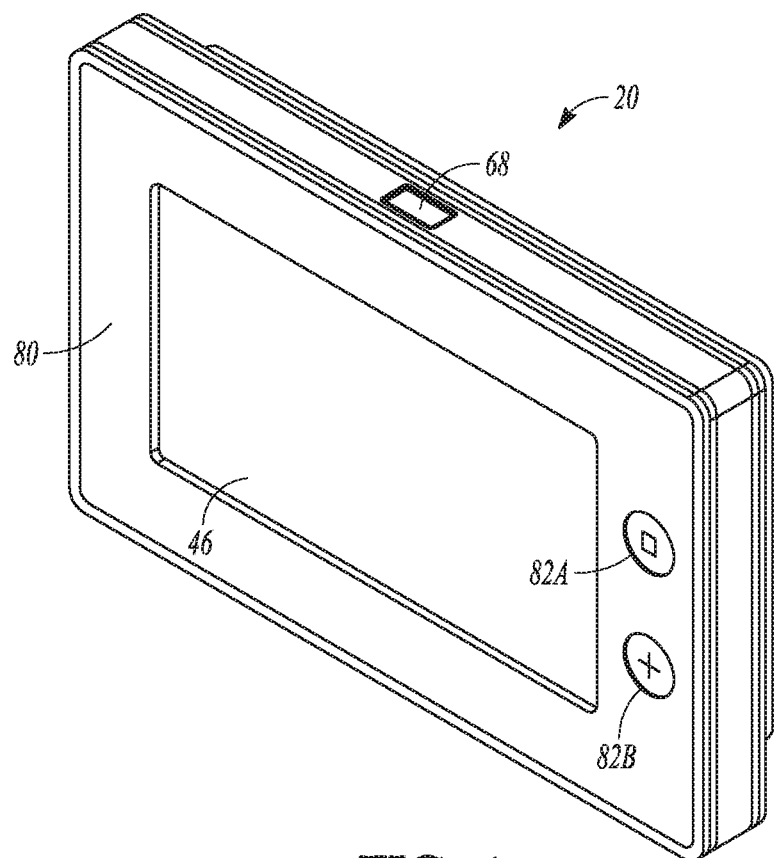
FIG. 4 is a perspective view of an example of the control panel of FIG. 2.

FIG. 4 is a perspective view of an example of the control panel of FIG. 2. The control panel 20 of FIG. 4 includes a housing 80, a user interface 46, e.g., a touchscreen display or other display, and, in some examples, one or more buttons 82A and 82B. A user may enter commands, navigate menus, and the like using the touchscreen and/or using the buttons 82A, 82B. It should be noted that, in some examples, the remote keypad 30 of FIG. 2 may be similar to the control panel 20 of FIG. 4. For purposes of conciseness, the remote keypad 30 and the control panel 20 will be described together.

The control panel 20 may also include a USB connector 68. In the non-limiting example shown in FIG. 4, the USB connector 68 is located at the top of the control panel 20. In some example implementations, an external web-camera (not depicted) may be connected to the control panel 20 via the USB connector 68.

The user interface 46 may be configured to display many different screens depending on the type of application, e.g., security or home automation. For example, the memory circuit 44 may store instructions that, when executed by the processor 40, cause the user interface to display a security panel, bed-side controller panel, home theater room controller panel, and/or a home automation panel. Aspects of home automation that may be displayed include, but are not limited to, a thermostat panel, a lighting panel, a door lock panel, a garage door panel, a home audio or other speaker system panel, or other type of panel.

Using various techniques of this disclosure, the control panel 20 and the remote keypad 30 may include the ability for a user to define a home screen and/or bookmark one or more panels using the home screen module 72. For example, a user may define a remote keypad 30 located in a home theater room to display a home theater room controller panel as a default home screen. As another example, a user may define a remote keypad 30 located in their bedroom to display a thermostat panel as a default home screen. As another example, the user may define a thermostat panel as a default home screen and may define the security panel using a bookmark to allow quick access.

As another example, the user may define a remote keypad 30 in their bedroom to be a bedside controller and have an "all lights in room ON/OFF" default home screen. As another example, the user may build a customized home screen for remote keypad 30 designated as a bedside controller in their bedroom. For example, the user may build a "go to bed" home screen that may include thermostat control, security panel control (e.g., "arm stay", and an "all lights OFF" control, or any other system control features that the user may use at bedtime. In some examples, each of these controls may be displayed on a single screen of the user interface of the remote keypad 30 for the user to individually control. That is, the user may individually turn down the thermostat, turn off all the lights, and arm the security system. In other examples, the "go to bed" home screen may allow a user to touch a single button on the user interface of the remote keypad 30 that initiates a sequence of events including, for example, turning down the thermostat, turning off all the lights, and arming the security system.

As another example, a user may build a customized home screen for a remote keypad 30 located in a hallway. For example, the user may build a customized "return from work" home screen that allows a user to touch a single button on the user interface of the remote keypad 30 in the hallway that initiates a sequence of events including, for example, turning up the thermostat and turning on various lights in the house. Each remote keypad 30 located about the house may have different home screens defined by the user.

In some example implementations, the user-defined home screens may display the status of various system components, e.g., a thermostat setting and an alarm status, and also display control icons to control the various system components, e.g., increase/decrease thermostat setting and arm/disarm the alarm system.

In one example implementation, when setting or defining a default home screen, a user may navigate through various menus on the control panel 20 until the user interface 46 displays the preferred home screen. The home screen module 72 may cause the user interface to display a home screen or bookmark icon. Once on the preferred home screen, the user may touch a displayed home screen (or bookmark) icon to confirm that the displayed home screen is the preferred home screen or bookmark. Upon receiving the confirmation, the home screen module 72 may store the settings in the memory circuit 44, e.g., in a user preferences or configuration file. The home screen module 72 may cause the user interface 46 to display the preferred home screen as the default screen based on the stored settings.

Similarly, a user may again navigate through various menus until the user interface 46 displays a panel that the user would like to bookmark as a favorite panel, e.g., a thermostat panel. Once on the desired screen, the user may touch a displayed home screen (or bookmark) icon to confirm that the displayed screen should be bookmarked as a favorite panel. Upon receiving the confirmation, the home screen module 72 may store the settings in the memory circuit 44, e.g., in a configuration file. The home screen module 72 may cause the user interface 46 to display the preferred home screen as the default screen based on the stored settings.

In another example implementation, rather than have the user navigate through various menus or screens until the user interface 46 displays the desired screen (either for default as a home screen or for bookmarking as a favorite), the user interface 46 may display thumbnail views or text, for example, of the various panels that can be selected as preferred panels. The home screen module 72 may prompt a user to select the desired screen, prompt the user to confirm that the displayed screen should be bookmarked as a favorite panel or as a default home screen, and then, upon receiving the confirmation, the home screen module 72 may store the settings in the memory circuit 44, e.g., in a configuration file.

FIGS. 10A-10D are examples of screenshots of various portions depicting a user-defined screen of a user-interface 46, e.g., display. As indicated above, the control panel 20 may include a home screen module 72 that can receive an input from a user defining one or more screens depicted on a display 46 and store data representing the at least one user-defined screen in a memory, e.g., memory circuit 44.

Figure 10A:
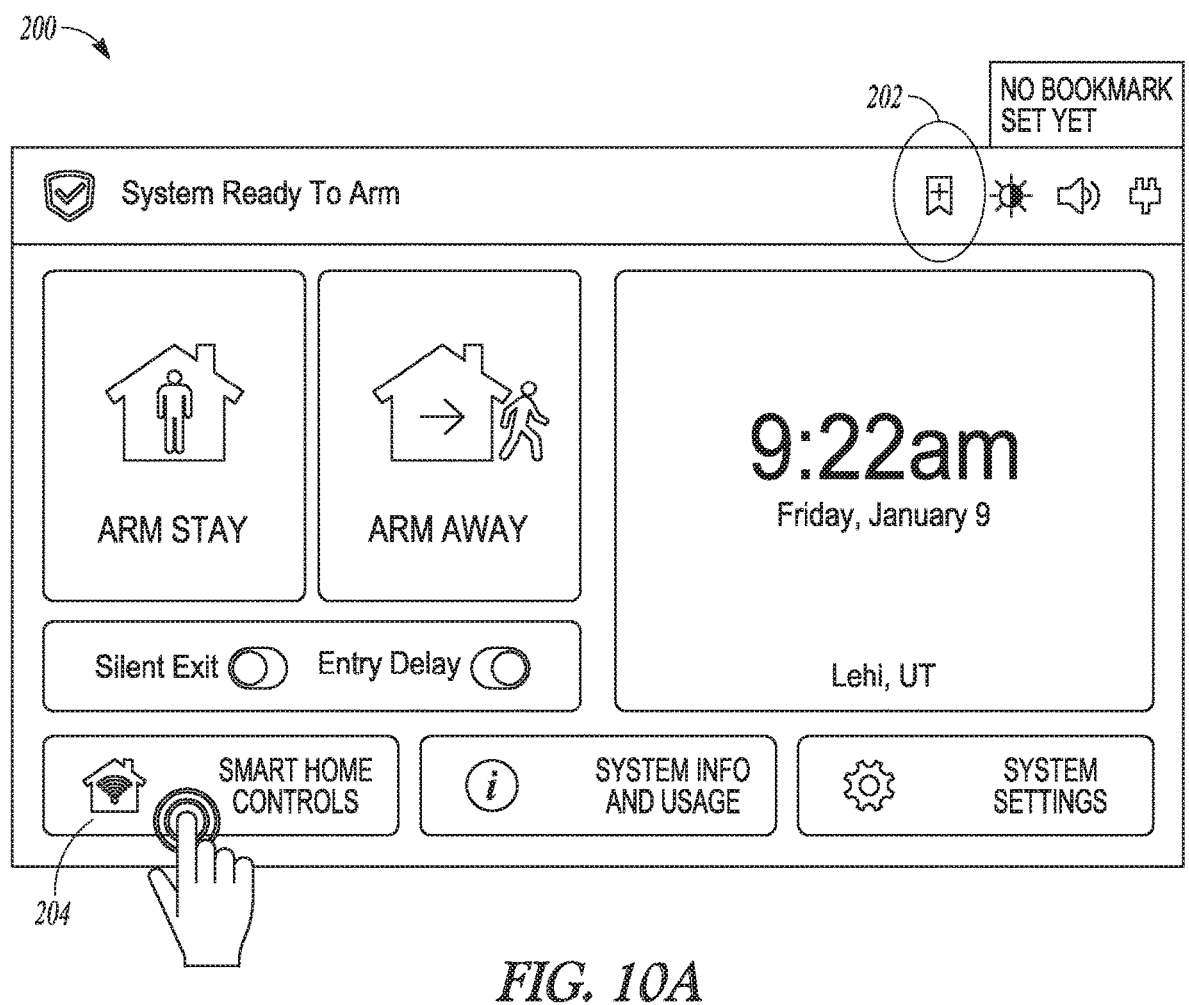
FIGS. 10A-10D are examples of screenshots of various portions depicting a user-defined home screen.
Figure 10B:
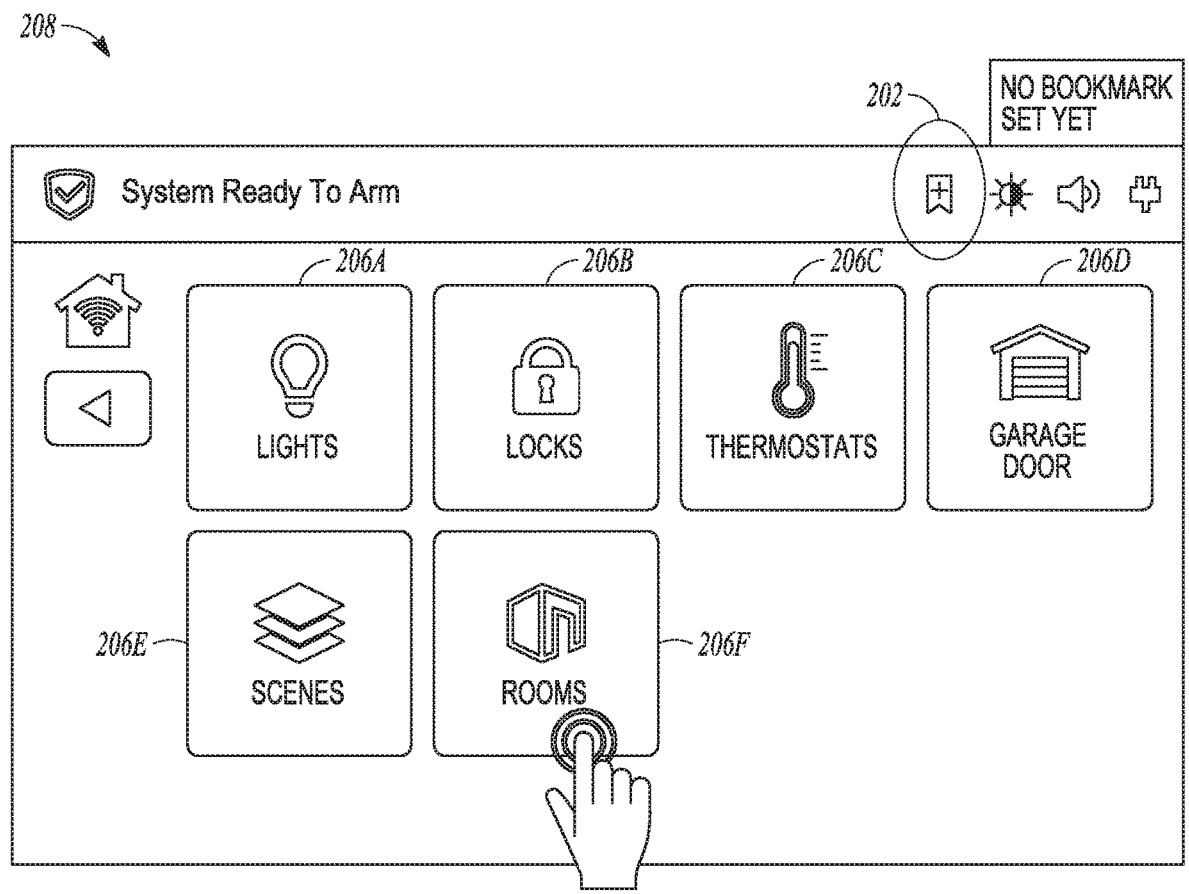
Figure 10C:
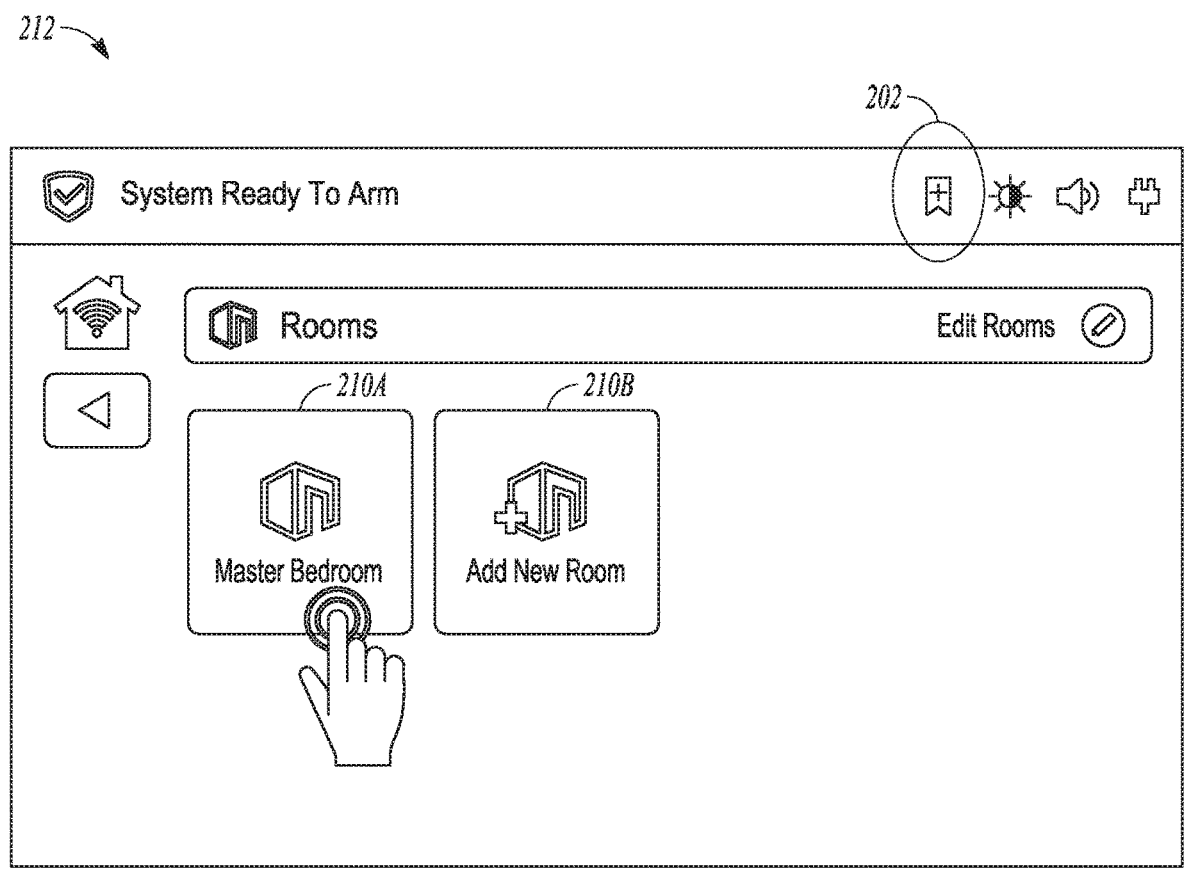

FIG. 10A is an example of a screenshot 200 in which the user has yet to provide input to define a screen, e.g., set a bookmark. A bookmark icon is shown at 202. In the examples shown in FIGS. 10A-10D, the user can define a screen for the master bedroom. To begin the task of defining the screen, the user can select the "smart home controls" button 204 at the bottom of the screen 200. Selecting the "smart home controls" button 204 can cause new buttons 206A-206F to appear on the screen, as seen in screen 208 in FIG. 10B. To define a screen for the master bedroom, the user can select the "rooms" button 206F on the screen 208. Selecting the "rooms" button 206F can cause one or more "room" buttons 210A-210B to appear on the screen 212, as seen in FIG. 10C. As seen in FIG. 10C, the screen 212 displays a "master bedroom" button 210A and an "add new room" button 210B, which can allow a user to define settings for a room other than the master bedroom.

Figure 10D:
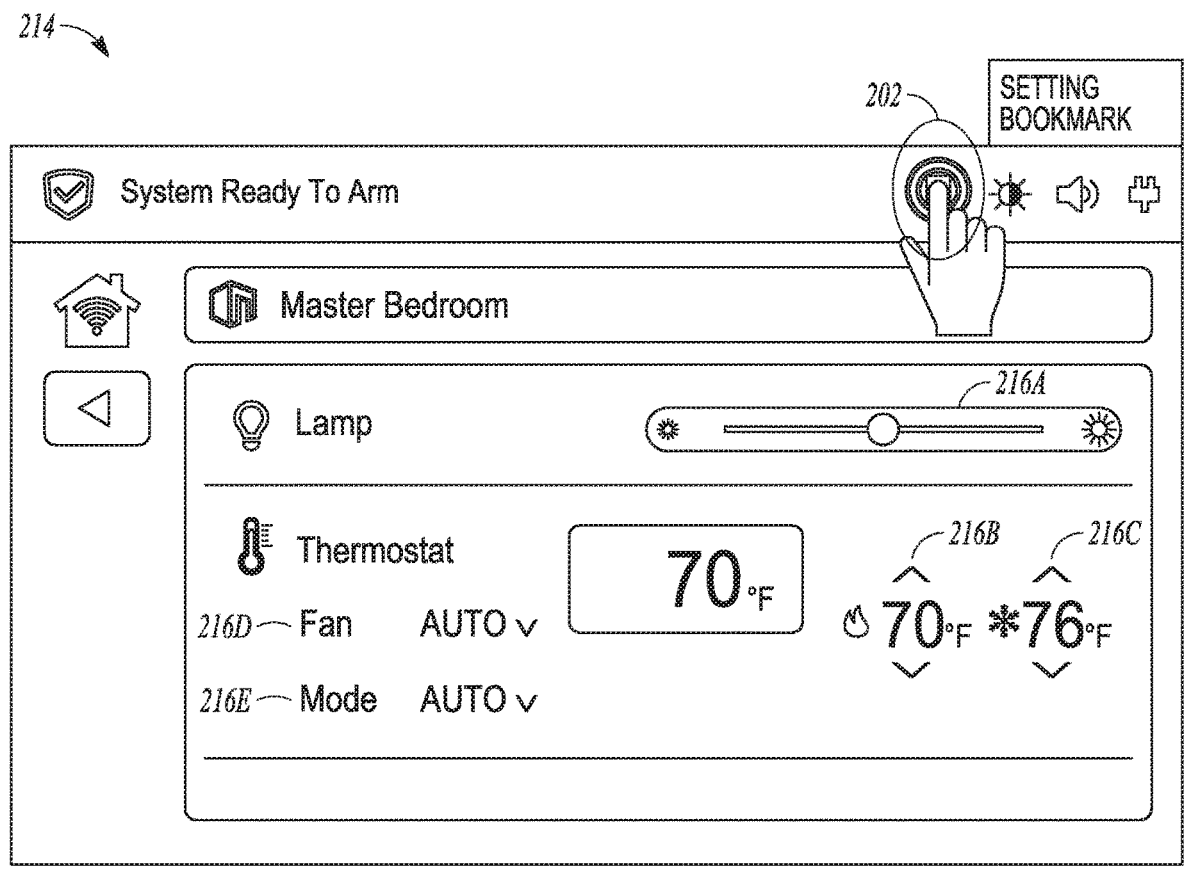

To define a screen for the master bedroom, the user can select the "master bedroom" button 210A on the screen 212 in FIG. 10C. Selecting the "master bedroom" button 210A can cause one or more control icons to appear on the screen 214, as seen in FIG. 10D. As seen in FIG. 10D, the user can define, for example, the lighting and/or the thermostat settings. For example, the user can use slider control icon 216A to set the brightness of the lighting for the master bedroom.

The user can also define the thermostat settings. For example, the user can define the heating and cooling set point temperatures using the up/down arrows shown generally at 216B, 216C, respectively. In addition, the user can define the fan settings at 216D and the mode settings at 216E. After defining the lighting and/or temperature settings, for example, for the master bedroom, the user can select the bookmark icon 202 to bookmark the screen for the master bedroom.

The home screen module 72 may constitute either a software module, e.g., code embodied on a non-transitory machine-readable medium, or a hardware-implemented module. If embodied as a software module, the memory circuit 44 may include computer-readable instructions that, when executed by the processor 40, cause the processor 40 to perform various functions attributed throughout this disclosure to the home screen module 72.

In various configurations, a hardware-implemented module may be implemented mechanically or electronically. For example, a hardware-implemented module may comprise dedicated circuitry or logic that is permanently configured, e.g., as a special-purpose processor, such as a field programmable gate array (FPGA) or an application-specific integrated circuit (ASIC), to perform certain operations. A hardware-implemented module may also comprise programmable logic or circuitry, e.g., as encompassed within a general-purpose processor or other programmable processor, that is temporarily configured by software to perform certain operations. It will be appreciated that the decision to implement a hardware-implemented module mechanically, in dedicated and permanently configured circuitry, or in temporarily configured circuitry, e.g., configured by software, may be driven by cost and time considerations.

Accordingly, the term "hardware-implemented module" should be understood to encompass a tangible entity, be that an entity that is physically constructed, permanently configured, e.g., hardwired, or temporarily or transitorily configured, e.g., programmed, to operate in a certain manner and/or to perform certain operations described herein. Considering embodiments in which hardware-implemented modules are temporarily configured, e.g., programmed, each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Figure 5:
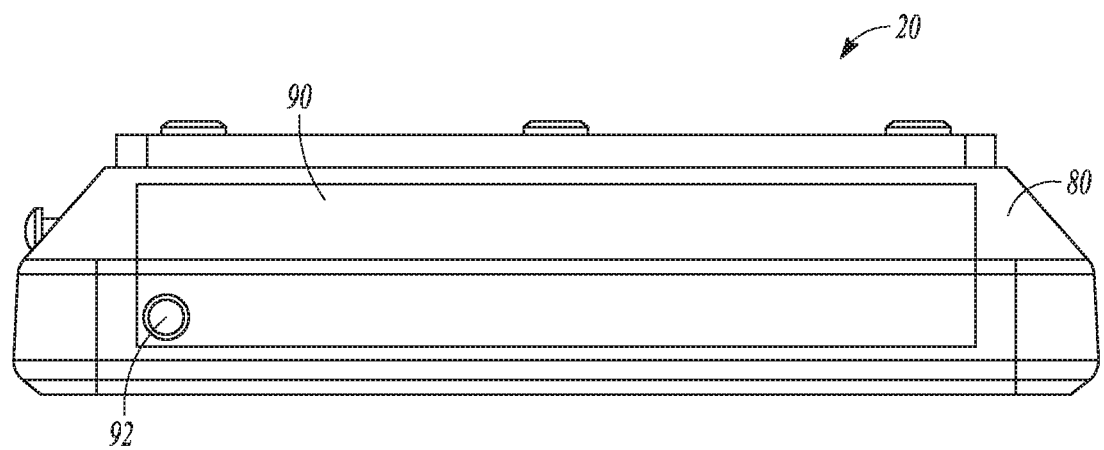
FIG. 5 is a side view of the example control panel of FIG. 4.

FIG. 5 is a side view of the example control panel of FIG. 4. As mentioned above, the control panel 20 may include a replaceable cellular module (depicted at 110 in FIGS. 7, 8A, 8B) that includes the cellular circuit 52, e.g., cellular radio, and the antenna 54 of FIG. 3. An end-user, e.g., customer or technician, may install or replace the replaceable cellular module by opening the door 90 of FIG. 5, e.g., after removing a screw (shown at 116 in FIG. 9) and inserting the module through a slot defined by the housing (shown at 93 in FIG. 9). The door 90 has an open state and a closed state, and the end-user replaceable cellular module is replaceable through the slot when the door is in the open state. In some examples, the door 90 can be snapped in place or snapped in place and secured with an optional screw. In some examples, the door can be removed and replaced without requiring a tool. In this manner, the replaceable cellular module is replaceable without disassembling the control panel or housing. After the replaceable cellular module is installed, the tamper detection circuit 56 of FIG. 3 may detect when the door 90 is opened, as described in more detail below.

Figure 6A:
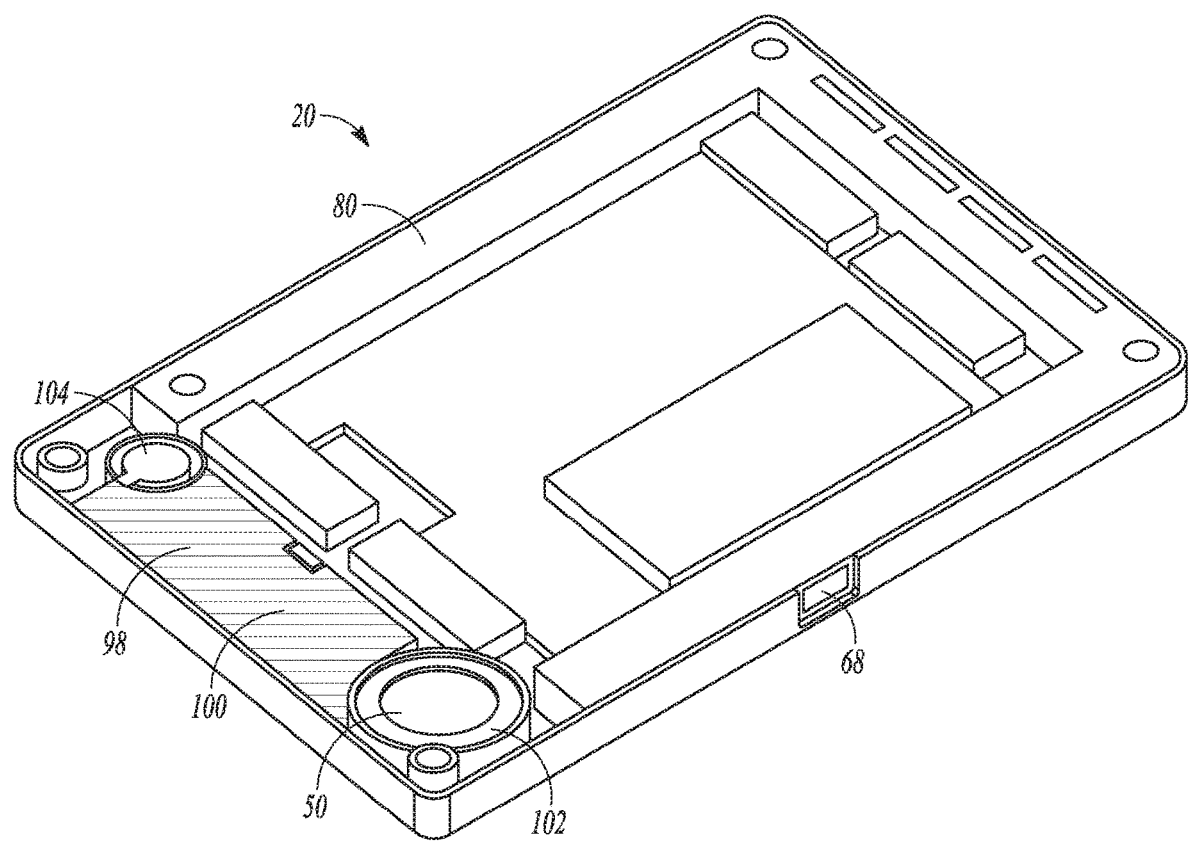
FIG. 6A is perspective front view of the example control panel of FIG. 4, illustrating a sealed speaker, in accordance with this disclosure.
Figure 6B:
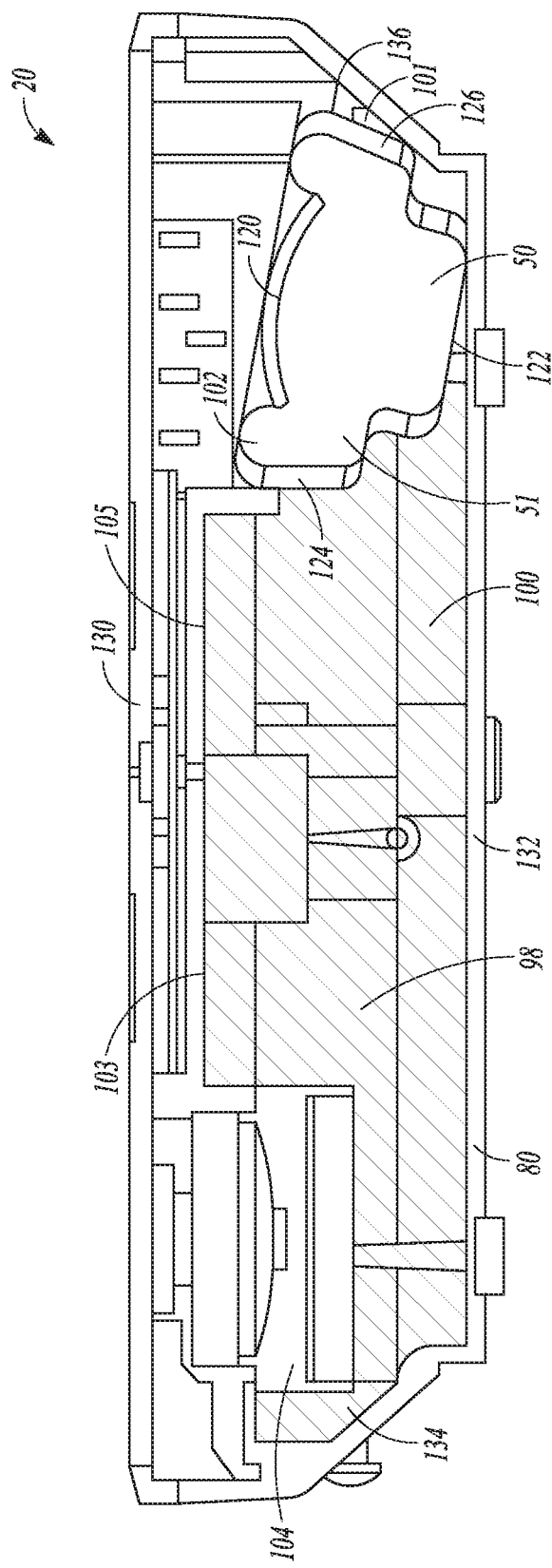
FIG. 6B is cross-sectional end view of the example control panel of FIG. 4, illustrating a sealed speaker, in accordance with this disclosure.

In addition to the techniques described above, the control panel 20 includes an improved speaker design. Speaker designs of existing security systems utilize forward facing, rearward facing, or side facing speakers with grills. These designs, however, often result in thin, metallic (e.g., tinny), unintelligible sounds. As shown in FIGS. 6A-6B and as described below, the sound quality and volume of the speaker 50 of the control panel 20 may be improved by using a sealed speaker enclosure, e.g., a resonant speaker enclosure, thus resulting in a thinner, more desirable panel with comparable sound quality. The control panel 20 may be configured to provide two-way communication using a microphone (not depicted) and the speaker 50. As such, the increase in bass and midrange frequency responses of the speaker 50 may improve the intelligibility and sound quality of received communication, e.g., from the central monitoring station 14.

In addition, the control panel 20 may be configured to provide sirens, signaling, and annunciation using the speaker 50. The sealed speaker enclosure 100 of FIGS. 6A and 6B may increase the volume of the speaker 50 over existing speaker designs.

FIG. 6A is perspective front view of the example control panel of FIG. 4, illustrating a sealed speaker enclosure, in accordance with this disclosure. The front cover of the control panel 20 has been removed in FIG. 6A in order to depict the speaker 50 within a sealed speaker enclosure 100 (depicted by cross-hatching in FIG. 6A). The sealed speaker enclosure 100 may increase the bass and midrange frequency responses of the speaker 50. As seen in FIGS. 6A-6B, the volume 98 extending to the left of the speaker 50 is the primary volume that forms the sealed speaker enclosure 100. In addition, in some examples, the diaphragm 102 of the speaker 50 may also form part of the sealed enclosure 100, which seals any air behind the diaphragm 102. The cross-hatching in FIG. 6A defines at least a portion of the boundary of the sealed speaker enclosure 100.

FIG. 6B is cross-sectional end view of the example control panel of FIG. 4, illustrating a sealed speaker, in accordance with this disclosure. The speaker 50 includes a front 120 from which sound is projected, a rear 122 opposite the front 120, a first side 124, and a second side 126 opposite the first side. The housing 80 can include a front interior side 130, a rear interior side 132 opposite the front interior side 130, a first interior side 134, and a second interior side 136 opposite the first interior side 134.

The sealed speaker enclosure 100 (shown with hatching) is positioned within the housing 80 and at least partially defined by a speaker case 103 positioned within the housing. In some example configurations, e.g., in a control panel having dimensions of about 2 inches by about 5.5 inches by about 1.25 inches, the volume of the sealed speaker enclosure 100 can be between about 0.35 liters to about 0.45 liters to provide the improved performance characteristics described in this disclosure.

To ensure that that the speaker enclosure is sealed, a sealant 105 can be applied, e.g., room-temperature vulcanization (RTV) silicone, resulting in a sealed sound box within the control panel 20. In some examples, the diaphragm 102 of the speaker 50 may also form part of the sealed enclosure 100, which seals any air behind the diaphragm 102. As seen in FIG. 6B, rather than extending behind the speaker 50, the primary volume of air 98 of the sealed speaker enclosure 100 is adjacent to the first side 124 of the speaker 50 and extends away from the first side 124 and, in some examples, behind other components within the control panel 20, e.g., piezoelectric element 104. A small, secondary volume of air 101 of the sealed speaker enclosure 100 may extend to the right of the speaker 50 in FIG. 6B.

In some examples, the second side 126 of the speaker 50 is positioned adjacent the second interior side 136 of the housing 80, and the sealed speaker enclosure 100 defines the secondary acoustic volume of air 101 that extends between the second side 126 of the speaker 50 and the second interior side 136 of the housing 80.

In some examples, the second side 126 of the speaker 50 is positioned adjacent the second interior side 136 of the housing 80, and the primary acoustic volume of air extends away from the first side 124 of the speaker 50 toward the first interior side 134 of the housing 80.

In some examples, the rear portion 122 of the speaker 50 is adjacent the rear interior side 132 of the housing 80, and the sealed speaker enclosure 100 extends across only a portion of the rear portion 122 of the speaker 50. For example, only a small portion of the sealed speaker enclosure 100 is positioned directly behind the speaker 50.

By taking advantage of spaces within the control panel 20 that are too small or would otherwise obstruct placement of the speaker 50, the design of the sealed speaker enclosure 100 of FIGS. 6A and 6B may result in a reduced profile of the control panel 20. Without the design of the sealed speaker enclosure 100 of FIGS. 6A and 6B, the dimensions of the control panel 20, e.g., the depth, may need to be increased in order to create an equivalent acoustic volume.

In some example implementations, the control panel 20 with the sealed speaker enclosure 100 may form part of an all-in-one home automation and security control panel, e.g., a control panel that includes all the radios of the home automation and security system without additional accessory boxes/panels.

Figure 7:
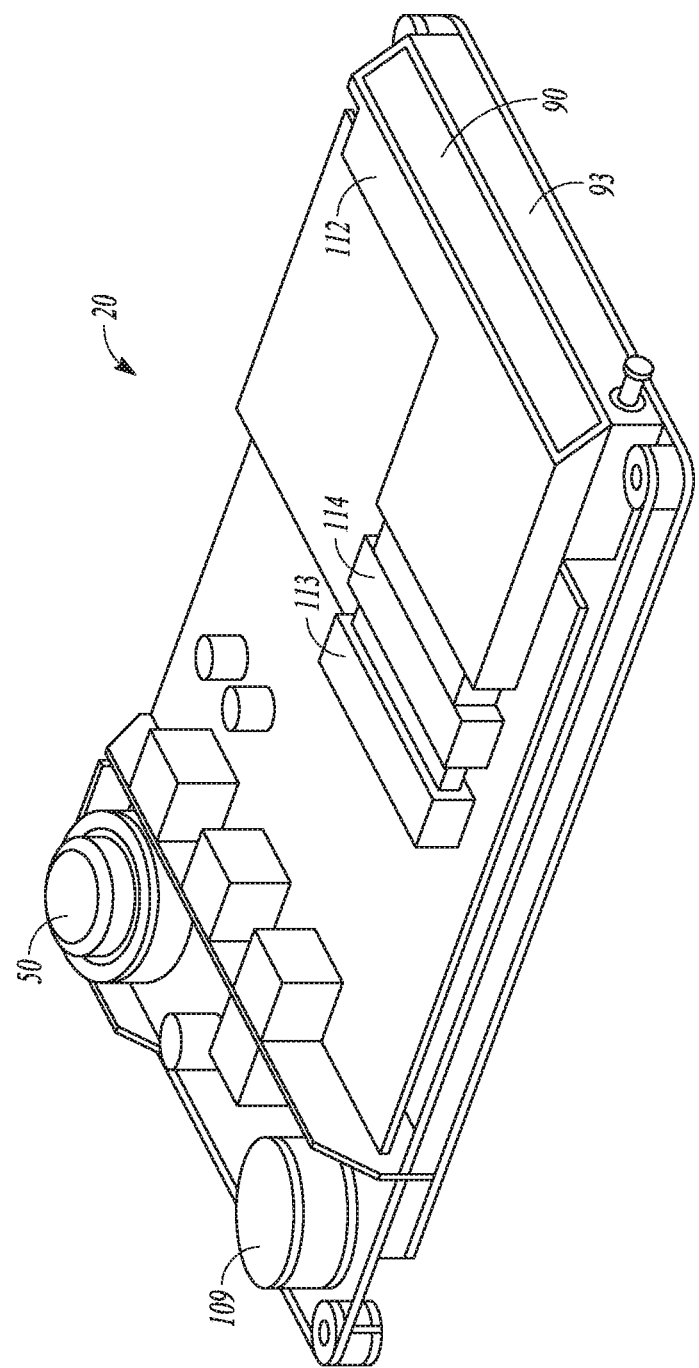
FIG. 7 is perspective back view of the example control panel of FIG. 6A, illustrating a replaceable cellular module, in accordance with this disclosure.

FIG. 7 is perspective back view of the example control panel of FIG. 6A, illustrating a replaceable cellular module, in accordance with this disclosure. More particularly, the control panel 20 of FIG. 7 may include an end-user replaceable cellular telephony module 110, that is removable from the control panel 20 without disassembling the control panel, having a body 112 that includes the cellular telephony circuit 52 and the cellular telephony antenna 54. The control panel 20 includes a door 90 through which the replaceable cellular module 110 may be inserted for connection to the circuitry of the control panel 20. For example, the control panel 20 can include a connector 113 sized and shaped or otherwise configured to be removably engaged by the end-user with a connector 114 coupled to the cellular circuit 52 and the body 112 of the replaceable cellular module 110.

In one example implementation, a customer or technician may open the door 90, remove the replaceable cellular module 110, and install a new replaceable cellular module 110 through the slot 93 (or compartment) when the door 90 is in an open state or position, e.g., removed. In some examples, the door 90 is removable and not hinged and can be affixed to the housing when installed and removed when it is opened. At least a portion of the end-user replaceable cellular module is sized and shaped or otherwise configured to fit through the door 90 and/or the slot 93. For example, in the event that the control panel 20 includes a replaceable cellular module 110 configured for an older cellular protocol, an updated replaceable cellular module 110, e.g., next generation protocol radios such as a 3G or a 4G protocol, may be shipped to and installed by the customer without having to disassemble the housing 80.

Figure 8A:
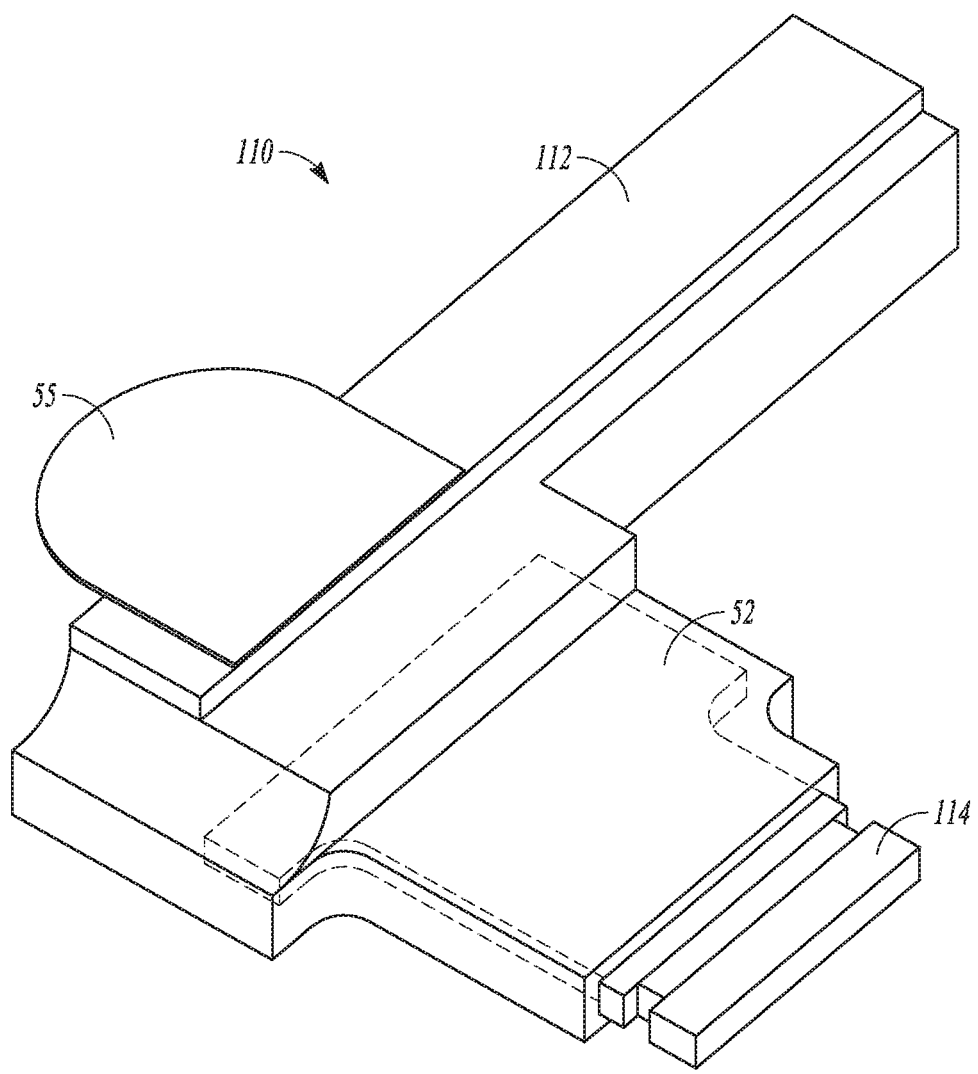
FIGS. 8A and 8B are perspective views of the replaceable cellular module of FIG. 7, in accordance with this disclosure.
Figure 8B:
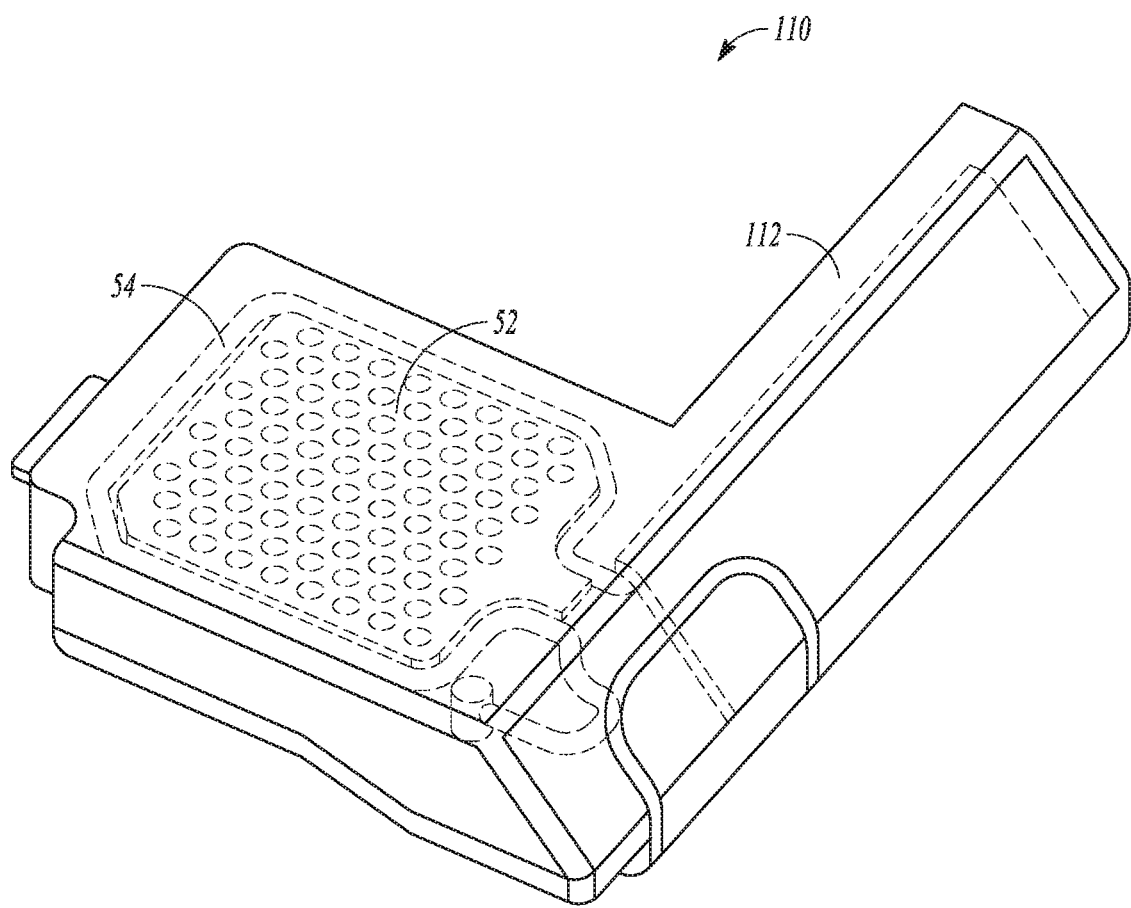

FIGS. 8A and 8B are perspective views of the replaceable cellular module 110 of FIG. 7, in accordance with this disclosure. For purposes of conciseness FIGS. 8A and 8B will be described together.

As seen in FIGS. 8A and 8B, the cellular circuit 52, e.g., radio chip, and the antenna 54 (shown in FIG. 8B) are attached to a body 112 and together form part of the replaceable cellular module 110. The antenna 54 is electrically connected to the cellular circuit 52, and the cellular circuit 52 is connected to the control panel 20 using a multi-pin connector 114. A pull-tab 55 can be included to assist the user in removing the replaceable cellular module 110 from the control panel 20.

The cellular circuit 52 and the antenna 54 may each be detached from the replaceable cellular module 110. For example, the cellular circuit 52 may be a circuit board that may be removed and replaced by another cellular circuit, e.g., radio chip, that snaps into position on the body 112. As another example, antenna 54 may be detachable by the service professional or end-user and replaced by a different type of antenna that has one or more improved performance characteristics. For example, a paddle antenna may be replaced by another antenna type that has different performance characteristics in order to produce an optimized radiation pattern, e.g., an isotropic radiation pattern. As another example, to enhance signal strength, the antenna 54 can be unwound and re-routed, e.g., out of the replaceable cellular module 110 and behind the wall. To re-route the antenna 54, one end of the antenna 54 can remain connected to the cellular circuit 52 and be unwound. The unconnected end can be pulled out of the replaceable cellular module 110 and positioned to adjust the signal strength, e.g., behind the wall supporting the control panel 20.

Figure 9:
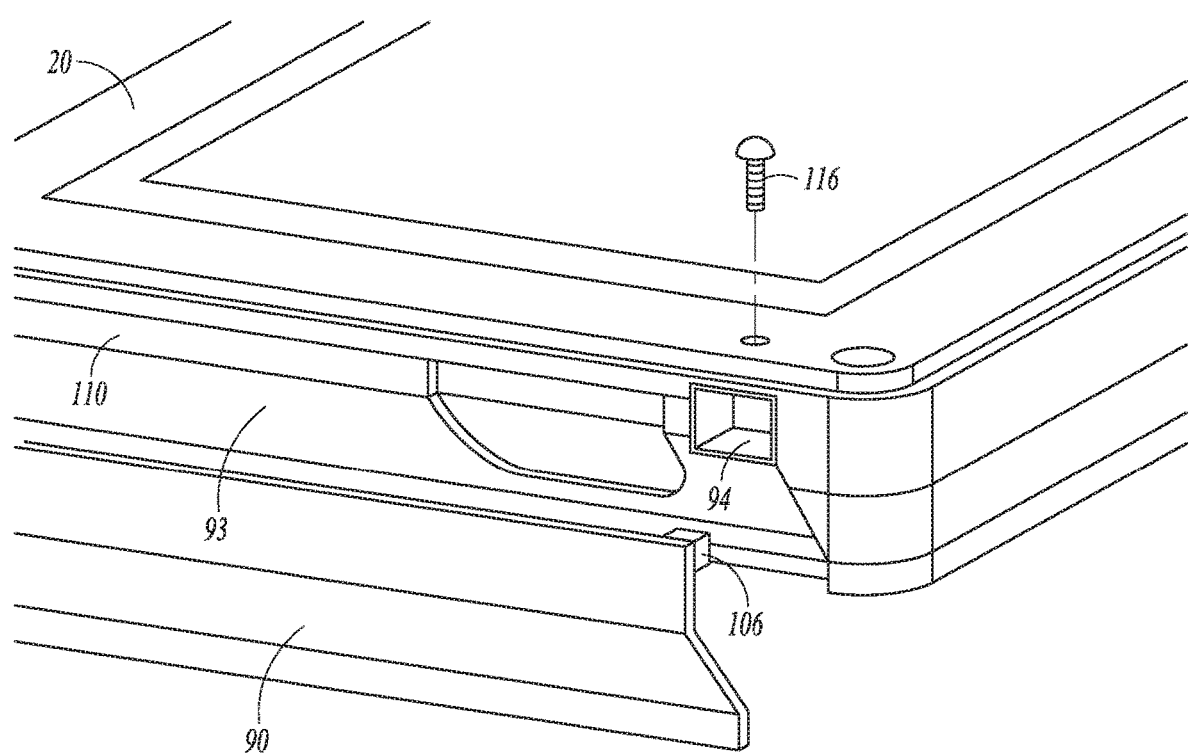
FIG. 9 is a perspective view of a portion of a control panel.

FIG. 9 is a perspective view of a portion of the control panel 20. In FIG. 9, a faceplate covering the control panel 20 has been removed to provide access the optional door locking screw 116. Once the door locking screw 116 is removed, the door 90 can be removed.

As mentioned above, the door 90 may be in communication with the tamper detection circuit 56. Using the techniques of this disclosure, tamper detection with the door 90 is a two-step process. In the first step, the tamper detection circuit 56 can detect tampering with the door 90. As one example, the tamper detection circuit 56 includes a microswitch 94 held in a first state, e.g., closed, by a portion 106 of the door 90, e.g., a tab. A person attempting to remove the replaceable cellular module 110 may begin removing the screw 116. Once the door 90 is removed, the portion 106 of the door 90 no longer holds the microswitch 94 in the first state and, as a result, the microswitch 94 may change to a second state, e.g., open.

In the second step, the processor 40 may detect the change in state of the microswitch 94, e.g., open. In response and prior to the removal of the replaceable cellular module 110 from the control panel 20, the processor 40 can cause the cellular circuit 52 to transmit a signal to the central monitoring station 14 that indicates that tampering has been detected at the control panel 20.

The time delay between the detection of tampering and removal of the replaceable cellular module 110 is sufficient for the processor 40 and the cellular circuit 52 to transmit a tamper detect signal to the central monitoring station 14. In some examples, the processor 40 and the cellular circuit 52 may detect and transmit the tamper detect signal in about 100 milliseconds (ms) to about one second.

In addition, in some example implementations, after the processor 40 and the cellular circuit 52 transmit the tamper detect signal to the central monitoring station 14, the processor 40 may power down the cellular circuit 52 to prevent damage to the control panel 20. That is, removing the replaceable cellular module 110 from the control panel 20 while the replaceable cellular module 110 is powered may damage the replaceable cellular module 110 and/or the control panel 20. For example, removal of a powered cellular module from the control panel 20 may cause electrical arcing at the connector pins, which may permanently damage the control panel 20. Hence, the processor may remove power from the cellular circuit 52 if the tamper detection circuit 56 detects that the door 90 has been opened.

NOTES AND EXAMPLES

Example 1 includes subject matter (such as a device, apparatus, or machine) comprising: an end-user replaceable cellular telephony module that is removable from the control panel without disassembling the control panel, the cellular module including: a body; a cellular telephony circuit coupled to the body; a cellular telephony antenna coupled to the body and the cellular telephony circuit; and a first connector coupled to the cellular telephony circuit and the body, wherein the first connector is sized and shaped or otherwise configured to be removably engaged by the end-user with a second connector in the control panel.

In Example 2, the subject matter of Example 1 may include, wherein the antenna is a first antenna, and wherein the module is configured such that the first antenna can be detached from the body by the end-user and replaced by a second antenna.

In Example 3, the subject matter of any one of Examples 1 to 2 may include, wherein the second antenna is configured to have a different performance characteristic than the first antenna.

In Example 4, the subject matter of any one of Examples 1 to 3 may include, a housing defining a slot, and wherein at least a portion of the end-user replaceable cellular module is sized and shaped or otherwise configured to fit through the slot.

In Example 5, the subject matter of any one of Examples 1 to 4 may include, a door removably affixed to the housing, wherein at least a portion of the end-user replaceable cellular module is sized and shaped or otherwise configured to fit through the slot when the door is removed.

In Example 6, the subject matter of any one of Examples 1 to 5 may include, a switch configured to detect an opening of the door affixed, wherein the switch is configured to change state upon detecting the opening; and a processor configured to: detect the changed state of the switch; and control transmission of a tamper detection signal to a central monitoring station upon detection of the changed state of the switch.

In Example 7, the subject matter of any one of Examples 1 to 6 may include, a display; a housing configured to support the display; and a speaker having a front from which sound is projected, a rear opposite the front, a first side, and a second side opposite the first side; and a sealed speaker enclosure positioned within the housing, the sealed speaker enclosure including a speaker case, wherein a portion of the speaker case and a portion of the speaker define the sealed speaker enclosure.

In Example 8, the subject matter of any one of Examples 1 to 7 may include, wherein the sealed speaker enclosure includes a speaker case.

In Example 9, the subject matter of any one of Examples 1 to 8 may include, wherein the sealed speaker enclosure has a volume of between about 0.35 liters to about 0.45 liters.

In Example 10, the subject matter of any one of Examples 1 to 9 may include, wherein the sealed speaker enclosure defines a primary acoustic volume of air that extends away from the first side of the speaker.

In Example 11, the subject matter of any one of Examples 1 to 10 may include, wherein the portion of the speaker that defines the sealed speaker enclosure includes a diaphragm of the speaker.

In Example 12, the subject matter of any one of Examples 1 to 11 may include, wherein the housing has a front interior side, a rear interior side opposite the front interior side, a first interior side and a second interior side opposite the first interior side, wherein the second side of the speaker is positioned adjacent the second interior side of the housing, and wherein the sealed speaker enclosure defines a secondary acoustic volume of air that extends between the second side of the speaker and the second interior side of the housing.

In Example 13, the subject matter of any one of Examples 1 to 12 may include, wherein the housing has a front interior side, a rear interior side opposite the front interior side, a first interior side and a second interior side opposite the first interior side, wherein the second side of the speaker is positioned adjacent the second interior side of the housing, and wherein the primary acoustic volume of air extends away from the first side of the speaker toward the first interior side of the housing.

In Example 14, the subject matter of any one of Examples 1 to 13 may include, wherein the housing has a front interior side, a rear interior side opposite the front interior side, a first interior side and a second interior side opposite the first interior side, wherein the speaker has a rear portion adjacent the rear interior side of the housing, and wherein the sealed speaker enclosure extends across only a portion of the rear portion of the speaker.

In Example 15, the subject matter of any one of Examples 1 to 14 may include, a Bluetooth circuit configured to receive at least one Bluetooth signal from one or more Bluetooth-enabled devices; a processor configured to: store data identifying an authorized Bluetooth-enabled device in a memory; detect the authorized Bluetooth-enabled device; and disarm the security system control panel in response to the detection.

In Example 16, the subject matter of any one of Examples 1 to 15 may include, a user interface including a display; and a home screen module configured to: receive an input from the end-user defining at least one screen depicted on the display; store data representing the at least one end-user-defined screen in a memory; and perform one or more actions previously associated by the user with the defined screen.

In Example 17, the subject matter of any one of Examples 1 to 16 may include, wherein the screen depicted on the display is a thermostat controller.

In Example 18, the subject matter of any one of Examples 1 to 17 may include, wherein the screen depicted on the display is a room controller that includes at least one of lighting and temperature controls.

In Example 19, the subject matter of any one of Examples 1 to 18 may include, a radio-frequency (RF) circuit configured to: when the control panel is in an unpowered state: receive power from an RF signal from an RF programming device; receive data embedded in the RF signal from the powered RF circuit; and using the received power from the RF signal store the data in a memory that is otherwise unpowered; and a processor configured to: when the control panel is in a powered state: receive the stored data; and configure at least one parameter using the received data.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Various aspects of the disclosure have been described. These and other aspects are within the scope of the following claims.

The invention claimed is:

1. A control panel comprising:
   a housing having a total-housing volume;
   a processor disposed within the housing and configured to execute instructions for controlling a security or building-automation system including the control panel;
   a speaker having a front from which sound is projected, a rear opposite the front, a first side, and a second side opposite the first side;
   a speaker circuit operatively coupled to the processor and to the speaker and configured to drive the speaker based on signals from the processor;
   a speaker case, wherein a portion of the speaker case and a portion of the speaker define a sealed speaker enclosure having a speaker-enclosure volume, and wherein the speaker-enclosure volume is less than half of the total-housing volume;
   wherein the housing has a front face defining a front-face plane, wherein the speaker has a front rim defining a speaker-front-rim plane, and wherein the speaker is oriented such that the speaker-front-rim plane is at a non-parallel angle to the front-face plane; and
   wherein the speaker is canted in the housing such that a first edge of the speaker front rim closest to the front-face plane is further from a rear interior side of the housing nearest to the speaker than a second edge of the speaker front rim closest to a first interior side of the housing.

2. The control panel of claim 1, wherein the sealed speaker enclosure defines a sealed speaker enclosure volume, wherein a primary portion of the sealed speaker enclosure volume extends only from one side of the speaker to the first interior side of the housing, and wherein the first interior side of the housing is furthest from the speaker.

3. The control panel of claim 1, wherein the sealed speaker enclosure defines a sealed speaker enclosure volume, and wherein a primary portion of the sealed speaker enclosure volume extends from a first side of the speaker to the first interior side of the housing furthest from the speaker and a secondary portion of the sealed speaker enclosure volume extends from a second side of the speaker to a second interior side of the housing, and wherein the first interior side of the housing is furthest from the speaker.

4. The control panel of claim 1, wherein the sealed speaker enclosure is sealed with room-temperature vulcanization (RTV) silicone.

5. The control panel of claim 1, wherein a spatial volume of the sealed speaker enclosure is between about 0.35 liters and about 0.45 liters.

6. The control panel of claim 1, wherein the processor is configured, upon receiving an input to arm the security system, to execute instructions that cause the speaker circuit to output a signal to the speaker that announces that the security system will soon be armed.

7. The control panel of claim 1, wherein the processor is configured to interrupt an audio stream playing through the speaker to transmit an alert through the speaker.

8. The control panel of claim 1, wherein the speaker and the sealed speaker enclosure in the control panel output a sound volume that is about ten decibels more, as measured at a wall about ten feet away from the control panel, than the speaker mounted in the control panel but where the speaker enclosure is not sealed.

9. The control panel of claim 1, further comprising a microphone, wherein the control panel is configured to provide two-way communication using the microphone and the speaker, and wherein the speaker provides an increase in bass and midrange frequency responses to improve the intelligibility and sound quality of received communication.

10. A method comprising:
    providing a security home automation system that includes a control panel in a housing, the housing having a total-housing volume, wherein the housing has a front face defining a front-face plane, a rear interior side, and a first interior side;
    disposing a processor and speaker circuit coupled to the processor within the housing and configuring the processor to execute instructions for controlling the security home automation system that includes the control panel;
    mounting a speaker in the housing, wherein the speaker includes a front rim, and wherein the mounting of the speaker includes orienting the speaker such that a speaker-front-rim plane is at a non-parallel angle to the front-face plane;
    coupling the speaker to the speaker circuit;
    sealing the speaker to the housing such that a sealed speaker enclosure is formed in the housing, the sealed speaker enclosure having a speaker-enclosure volume, wherein the speaker-enclosure volume is less than half of the total-housing volume; and
    canting the speaker in the housing such that a first edge of the speaker front rim closest to the front-face plane is further from the rear interior side of the housing nearest to the speaker than a second edge of the speaker front rim closest to the first interior side of the housing.

11. The method of claim 10, wherein the sealed speaker enclosure defines a sealed speaker enclosure volume, the method further including
    mounting the speaker such that a primary portion of the sealed speaker enclosure volume extends only from one side of the speaker to the first interior side of the housing, wherein the first interior side of the housing is furthest from the speaker.

12. The method of claim 10, wherein the sealed speaker enclosure defines a sealed speaker enclosure volume, the method further including
    mounting the speaker such that a primary portion of the sealed speaker enclosure volume extends from a first side of the speaker to the first interior side of the housing and a secondary portion of the sealed speaker enclosure volume extends from a second side of the speaker to a second interior side of the housing, wherein the first interior side of the housing is furthest from the speaker.

13. The method of claim 10, wherein the sealing the speaker to the housing includes sealing the sealed speaker enclosure with room-temperature vulcanization (RTV) silicone.

14. The method of claim 10, wherein a spatial volume of the sealed speaker enclosure is between about 0.35 liters and about 0.45 liters.

15. An apparatus comprising:
    a housing, wherein the housing has a front face defining a front-face plane, a rear interior side, and a first interior side;

a control panel mounted in a housing, the housing having a total-housing volume;
means for controlling a security home automation system that includes the control panel;
means for mounting a speaker in the housing and for operatively coupling the speaker to the speaker circuit, wherein the speaker has a front rim, and wherein the means for mounting the speaker includes orienting the speaker such that a speaker-front-rim plane is at a non-parallel angle to the front-face plane and the speaker is oriented such that a first edge of the speaker front rim closest to the front-face plane is further from the rear interior side of the housing nearest to the speaker than a second edge of the speaker front rim closest to the first interior side of the housing; and
means for sealing the speaker to the housing such that a sealed speaker enclosure is formed in the housing, the sealed speaker enclosure having a speaker-enclosure volume, wherein the speaker-enclosure volume is less than half of the total-housing volume.

\* \* \* \* \*